June 9, 1925.  1,541,047
R. E. HART
DOUBLE BEARING THROTTLE
Filed April 3, 1923
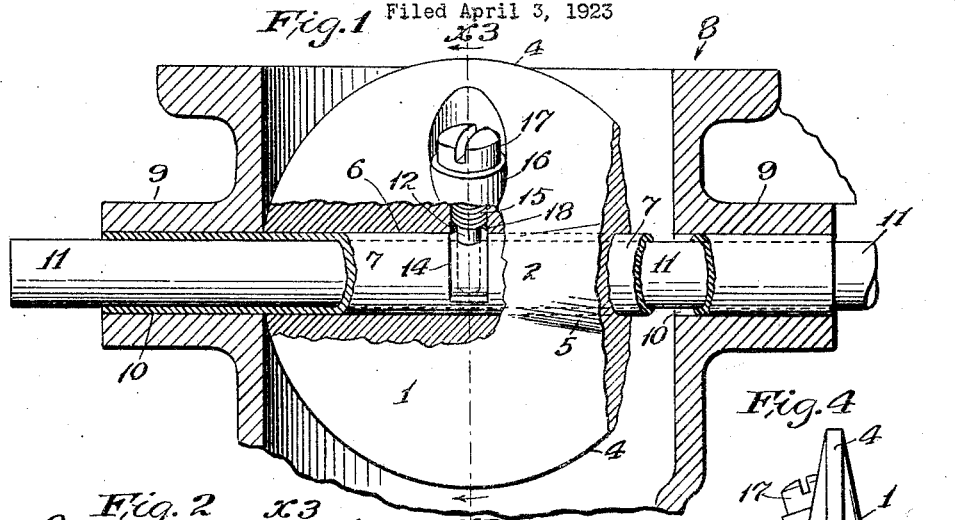
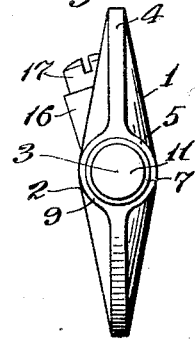
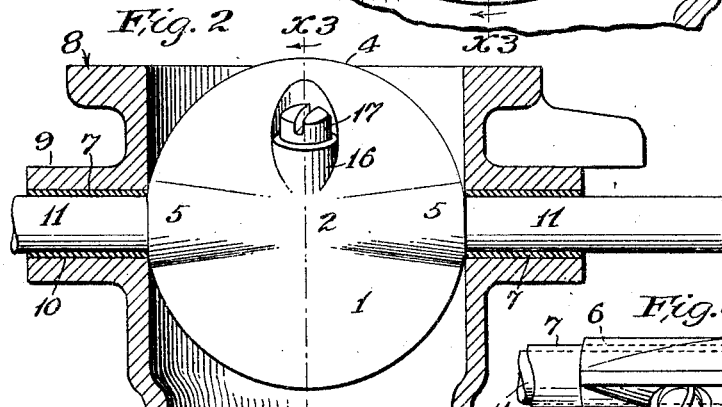
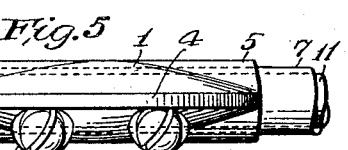
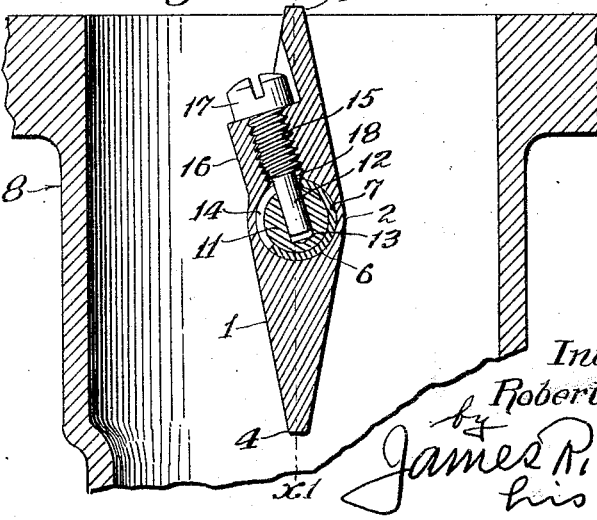
Witness
C. C. Holly.
Inventor
Robert E. Hart
by James R. Townsend
his atty Patented June 9, 1925.

1,541,047

UNITED STATES PATENT OFFICE.

ROBERT E. HART, OF LOS ANGELES, CALIFORNIA, ASSIGNOR TO THE ENSIGN CARBURETOR COMPANY, OF LOS ANGELES, CALIFORNIA.

DOUBLE-BEARING THROTTLE.

Application filed April 3, 1923. Serial No. 629,736.

*To all whom it may concern:*

Be it known that I, ROBERT E. HART, a citizen of the United States, residing at Los Angeles, in the county of Los Angeles and State of California, have invented a new and useful Double-Bearing Throttle, of which the following is a specification.

Great difficulty has heretofore been experienced with throttles for internal combustion engines used on trucks and on other automotive apparatus due to wear of throttle bearings, and an object of this invention is to prevent such wear and to increase the life of the throttle apparatus.

An object of this invention is to increase the length of the bearing for the throttle shaft and to relieve the throttle shaft and bearings of a part of the load which is imposed by the suction against the throttle disk when the throttle is closed.

A further object is to prevent the high depression on the engine side of the throttle when the throttle is closed, from causing a flow of air and a consequent introduction of dust and other abrasive particles and substances along the throttle shaft, which introduction has heretofore been one of the principal causes of wear and destruction of throttle apparatus.

This invention is broadly new, basic and pioneer in that I mount the throttle plate or shutter to revolve around and on a tube as a bearing, and the throttle shaft proper has a bearing throughout the length of this tube and on the inside thereof; the tube being transversely slotted through an arc of 90° to allow a suitable dowel pin threaded or otherwise fastened in the throttle plate or shutter to engage the shaft so that the throttle plate may be revolved around its axis and driven by its shaft.

This construction gives a bearing for the throttle shaft throughout its whole length within the structure, and any suction applied from the engine side of the throttle to draw in air and dust must be driven from the edge of the plate along the bearing of the plate on the sleeve to the location of the dowel and thence through the length of the tube to the outer end of the bearing, thus making it possible to practically exclude foreign substances from the bearing.

I place the dowel pin on the side of the throttle plate away from the engine so that the dowel is not exposed to the suction and hence insures minimized or entire lack of flow along the shaft.

An object is to create a resistance to flow of outside air to the throttle by increasing the length of the path of such flow and by arranging the parts so that they are not directly exposed to the high depression or vacuum.

The tube may be sectional, but it is preferably integral throughout and is so shown, thus affording maximum dust exclusion.

Other objects, advantages and features of invention may appear from the accompanying drawing, the subjoined detail description and the appended claims.

The accompanying drawing illustrates the invention.

Figure 1 is a fragmental elevation of the invention applied in a throttle tube which is shown in axial section on the plane of the axis of the throttle. Line $x^1$, Fig. 3 indicates the line of section. The integral bearing tube shown is broken away in part for clearness of illustration.

Fig. 2 is an elevation of the open throttle shown in Fig. 1; the disk being unbroken and the continuous bearing tube and throttle tube being shown in section from the ends of the throttle plate to the sides of the throttle body or tube.

Fig. 3 is a section on line $x^3$, Figs. 1 and 2.

Fig. 4 is a detached end view of the throttle shaft and bearing and edge view of the throttle plate thereon.

Fig. 5 is an edge view of a modified construction of the throttle mounted on the shaft and tubular bearing for shaft and throttle plate.

The throttle plate or shutter is preferably in the form of a disk 1 made as a casting having a transverse thickened intermediate portion 2 around the axis 3 of the throttle and said throttle disk is reduced in thickness at its edges 4, extending on each side of the bearing bosses 5 at the axial ends of the disk which bosses are adapted to accommodate the bore 6 which receives the bearing tube 7 mounted in the throttle tube 8, which is provided with bosses 9 having the bore 10 transversely to the throttle tube in which the bearing tube 7 is mounted practically air and friction tight.

The throttle shaft 11 is journalled in the tube 7 and is fixed to the throttle disk 1 by suitable means shown in the form of a pin 12 fixed to the throttle disk and inserted into a socket 13 in the shaft 11. Said pin 12 is fixed to the throttle disk 1 and is accommodated in an arc-slot 14 in the tubular bearing 7; said slot being of sufficient length to accommodate the pin throughout a movement of 90° so that the throttle may be fully opened and closed.

The pin 12 is formed on the end of a screw 15 screwed through a boss 16 on one side of the throttle disk; said side being preferably the side away from the engine, not shown, and that would be undermost when the throttle is closed. Said screw terminates in a head 17 and is adapted to jam against the boss when the screw is fully seated and before the pin 12 reaches the bottom of its socket 13 so that while the disk is secured by the pin 12 against any shifting, either longitudinally or rotatably on the throttle shaft 11, no pressure is exerted to displace or distort the shaft or disk with relation to each other.

In mounting the throttle in the throttle tube 8, the disk will be brought into axial relation to the bearing of the bosses 9, and the tubular bearing 7 will be inserted through the bosses and disk and there forms a bearing for the disk. Then the throttle shaft is inserted through the tubular bearing, and the socket 13 is brought into register with the slot 14 and a threaded bore 18 into which the screw 15 is adapted. Said screw is then inserted and screwed home with the pin 12 passing through the slot 14 and inserted in the socket 13 which it fits snugly, nearly but not quite to the bottom of the socket from which bottom it is held by the screw head when the screw is screwed down so as to firmly jam the head 17 against the end of the boss 16.

The throttle shaft 11 will be connected to operating means and will be operated in the usual way, illustration of which is not necessary in the drawings.

In practical operation the wear and strain of the throttle shaft is all borne by the tubular bearing 7 extending from end to end of the throttle tube bearing bosses, and all the suctional pressure upon the throttle plate is borne by the outside of the tubular bearing 7 and the close joint between the walls of the bore through the plate.

I claim:

1. The combination with a throttle tube, of a bearing tube extending thereacross; a throttle plate journalled on the bearing tube; a throttle shaft inside the bearing tube; and means fixing the throttle plate to the throttle shaft.

2. The combination with a tube having an arc-slot, of a plate mounted on said tube; a shaft inserted in said tube and provided with a socket; and a pin extending from the plate into the socket to prevent rotative and longitudinal displacement of the plate with relation to the shaft.

3. The combination with a tube having an arc-slot, of a shaft having a socket; a plate journalled on the tube and a pin fixed to the plate and extending through the slot into the socket.

4. The combination with a tube having an arc-slot, of a shaft having a socket; a plate journalled on the tube; a screw threaded in the plate; and provided with a pin extending through the slot and into the socket; said screw being jammed against the plate; and adapted to fit the socket without endwise pressure against the shaft.

5. The combination with a throttle tube, of a sleeve mounted in said tube; a throttle plate journaled on said sleeve; a shaft journaled in said sleeve; and means connecting said shaft to said throttle plate to operate the throttle plate upon operation of the shaft.

In testimony whereof, I have hereunto set my hand at Los Angeles, California, this 28th day of March, 1923.

ROBERT E. HART.

Witness:
ARTHUR F. LARRABEE.